United States Patent [19]

Brambilla

[11] Patent Number: 5,132,062

[45] Date of Patent: Jul. 21, 1992

[54] EXTRUSION HEAD FOR FOAMED MATERIAL, IN PARTICULAR FOR POLYVINYL-CHLORIDE-BASED FOAMED MATERIAL

[75] Inventor: Romano Brambilla, Modena, Italy

[73] Assignee: Brabor S.r.l., Ubersetto di Fiorano, Italy

[21] Appl. No.: 512,414

[22] Filed: Apr. 23, 1990

[30] Foreign Application Priority Data

Apr. 28, 1989 [IT] Italy .................. 20300 A/89

[51] Int. Cl.⁵ ............................................ B29C 47/90
[52] U.S. Cl. .................... 264/45.5; 264/45.9; 264/209.4; 264/209.7; 425/4 C; 425/379.1; 425/817 C
[58] Field of Search .......... 264/51, 45.9, 46.1, 264/45.5, 237, 209.7, 209.4; 425/378.1, 379.1, 4 C, 817 C, 461–467, 325, 197, 382.4

[56] References Cited

U.S. PATENT DOCUMENTS

| 2,562,135 | 7/1951 | Strobel | 425/325 |
|---|---|---|---|
| 3,299,192 | 1/1967 | Lux | 264/237 |
| 3,713,762 | 1/1973 | Oisugu | 425/197 |
| 3,764,642 | 10/1973 | Boutillier | 264/237 |
| 3,857,914 | 12/1974 | Aishima et al. | 425/4 C |
| 3,993,721 | 11/1976 | Soda et al. | 264/45.5 |
| 4,154,563 | 5/1979 | Johnson | 425/325 |
| 4,362,683 | 12/1982 | Otsuka et al. | 425/466 |
| 4,732,718 | 3/1988 | Jentet | 425/325 |
| 4,960,549 | 10/1990 | Brooks et al. | 264/45.5 |

FOREIGN PATENT DOCUMENTS

| 47-43187 | 10/1972 | Japan | 264/46.1 |
|---|---|---|---|
| 48-40067 | 11/1973 | Japan | 264/45.5 |
| 49-20384 | 5/1974 | Japan | 264/45.5 |
| 52-7022 | 2/1977 | Japan | 425/325 |
| 53-258 | 1/1978 | Japan | 425/461 |

*Primary Examiner*—Jeffery Thurlow
*Attorney, Agent, or Firm*—Guido Modiano; Albert Josif

[57] ABSTRACT

The extrusion head has a head body which accommodates a male element and defines, in co-operation with the male element, a passage for material to be extruded. The passage extends around the male element and leads outward through an extrusion hole which is located proximate to an end of the head. A cooling element is applied at the extrusion hole and a hole is defined therein for the passage of the extruded material. The latter hole has a configuration which corresponds to the profile of the extruded element to be obtained, in order to achieve the rapid cooling of the extruded element exiting from the extrusion hole.

6 Claims, 2 Drawing Sheets

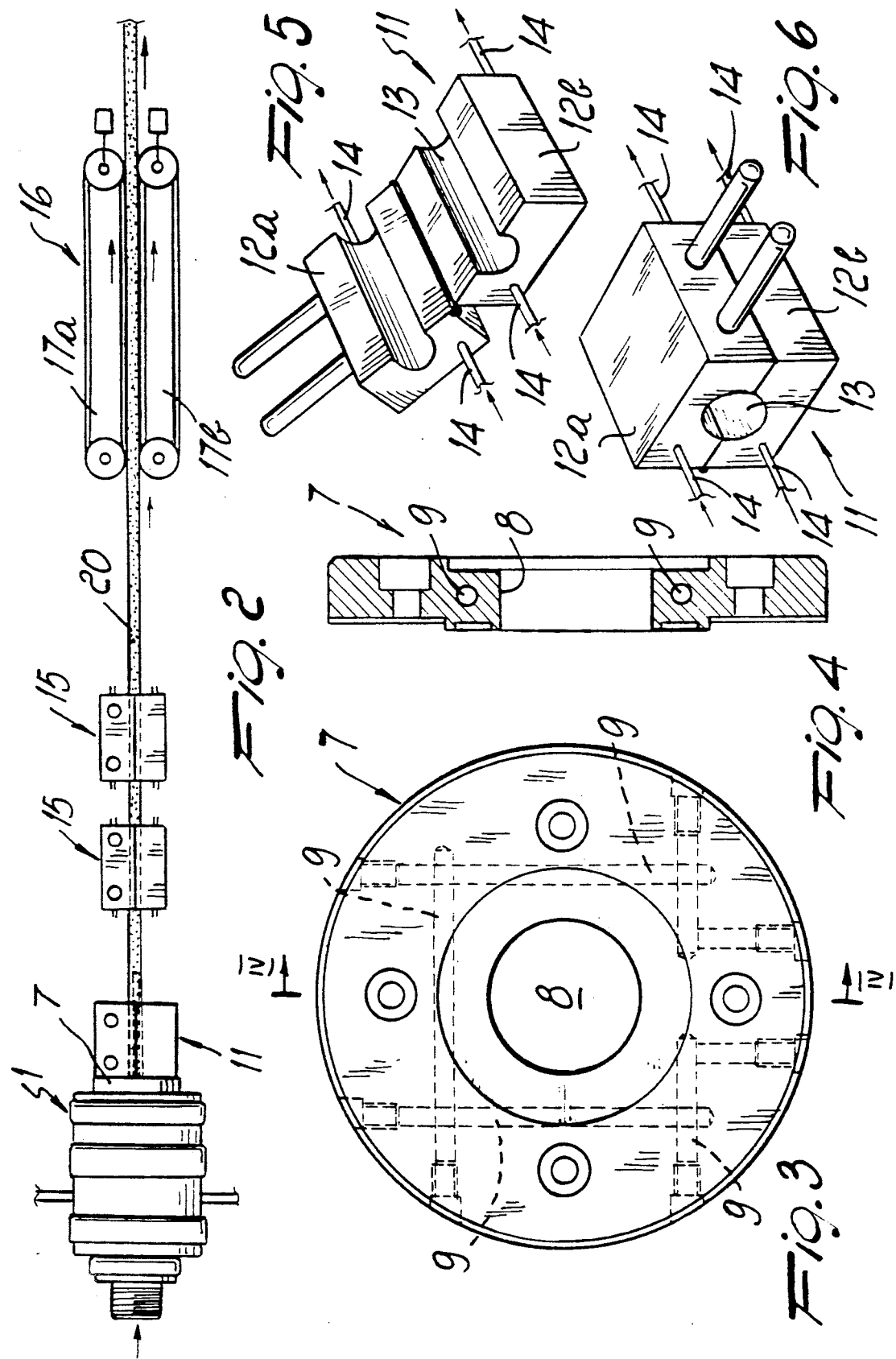

EXTRUSION HEAD FOR FOAMED MATERIAL, IN PARTICULAR FOR POLYVINYL-CHLORIDE-BASED FOAMED MATERIAL

BACKGROUND OF THE INVENTION

The present invention relates to an extrusion head for foamed material, in particular for polyvinylchloride-based foamed material.

Extrusion heads for foamed material, for example PVC with the addition of substances which cause its foaming, are known which substantially comprise a head body in which a cavity accommodating a male element is defined. A passage for the material to be extruded is defined between the outer surface of the male element and the walls of said cavity, and said material is pushed into the extrusion head at a preset pressure. The passage along which the semi-liquid or pasty material is pushed extends around the male element and leads outward through an extrusion hole which is located proximate to a longitudinal end of the head and is shaped correspondingly to the profile of the extruded body to be obtained.

The material pushed through the extrusion head completes its expansion in the region of the extrusion hole, and the extruded body thus obtained follows a rectilinear path, passing through "gauges" arranged in series. Said gauges are substantially constituted by cooled blocks in which a passage is defined with a configuration which reproduces that of the profile of the extruded body. In passing through said gauges, the extruded body is cooled progressively so as to gradually stabilize its configuration.

In many cases, the shaped passage defined in the gauges is kept at negative pressure so as to obtain the adhesion of the extruded body to the walls of said passage, utilizing a residual expansion of the material which allows to obtain extruded bodies with excellent surface finish.

Means for entraining the extruded body are provided downstream of the gauges along the direction of extrusion and are generally constituted by a pair of opposite closed-loop belts or tracks between which the extruded body is inserted so as to advance it in accordance with the extrusion speed.

At the beginning of the extrusion, the initial end of the extruded body is manually gripped and inserted between the pair of tracks, placing the extruded body in the gauges, which are conveniently open during this operation, thus starting the extrusion process which, after the beginning of the entrainment effected by the tracks, can continue automatically with no further manual intervention.

This necessary extrusion-starting operation has some practical problems in execution.

In conventional extrusion heads, the extruded body which has just exited from the extrusion hole is in fact very fragile due to the fact that the material completes its expansion in the air at the exit of the extrusion hole, and this makes its handling troublesome. Due to this fragility, and also due to the fact that since the extruded body is not yet subject to the traction action of the entrainment means it tends to expand more than the passages defined in the gauges, and it is extremely difficult to place the extruded body correctly in the cooling gauges.

The difficulties in handling the extruded body in this initial extrusion step are unavoidably the source of time losses which considerably affect the productivity of an extrusion system.

The initial portion of the extruded body, i.e. a portion thereof which is substantially equal in length to the distance between the extrusion head and the entrainment tracks, must furthermore necessarily be discarded due to the deformations or breakages which occur during this operation.

SUMMARY OF THE INVENTION

The aim of the present invention is to solve the above described problems by providing an extrusion head which makes the initial extrusion step easier and faster, while considerably reducing the time necessary for carrying out such step.

Within the scope of this aim, an object of the invention is to provide an extrusion head which allows to improve the productivity of an extrusion system.

Another object of the invention is to provide an extrusion head which can be obtained in a simple manner and with low-cost modifications from a conventional extrusion head.

A further object of the invention is to provide an extrusion head which allows to obtain extruded elements with an excellent degree of surface finish.

Still another object of the invention is to provide an extrusion head which considerably reduces initial process waste.

This aim, these objects and others which will become apparent hereinafter are achieved by an extrusion head for foamed material, in particular for polyvinylchloride-based foamed material, which comprises a head body which accommodates a male element and defines, in co-operation with said male element, a passage for the material to be extruded, said passage extending around said male element and leading outward through an extrusion hole located proximate to an end of said head, characterized in that at least one cooling element is applied at said extrusion hole, a hole being defined in said cooling element for the passage of the extruded material, said passage hole having a configuration which corresponds to the profile of the extruded element to be obtained, for a rapid cooling of the extruded element exiting from said extrusion hole.

BRIEF DESCRIPTION OF THE DRAWINGS

Further characteristics and advantages of the invention will become apparent from the description of a preferred but not exclusive embodiment of the extrusion head according to the invention, illustrated only by way of non-limitative example in the accompanying drawings, wherein:

FIG. 2 is a schematic view of an extrusion system with the extrusion head according to the invention;

FIG. 3 is an enlarged front elevation view of the cooling element according to the invention;

FIG. 4 is a sectional view of FIG. 3 taken along the axis IV—IV;

FIGS. 5 and 6 are schematic perspective views of a cooling gauge of the extrusion system illustrated in FIG. 2.

DESCRIPTION OF THE PREFERRED EMBODIMENTS

Figure 1:
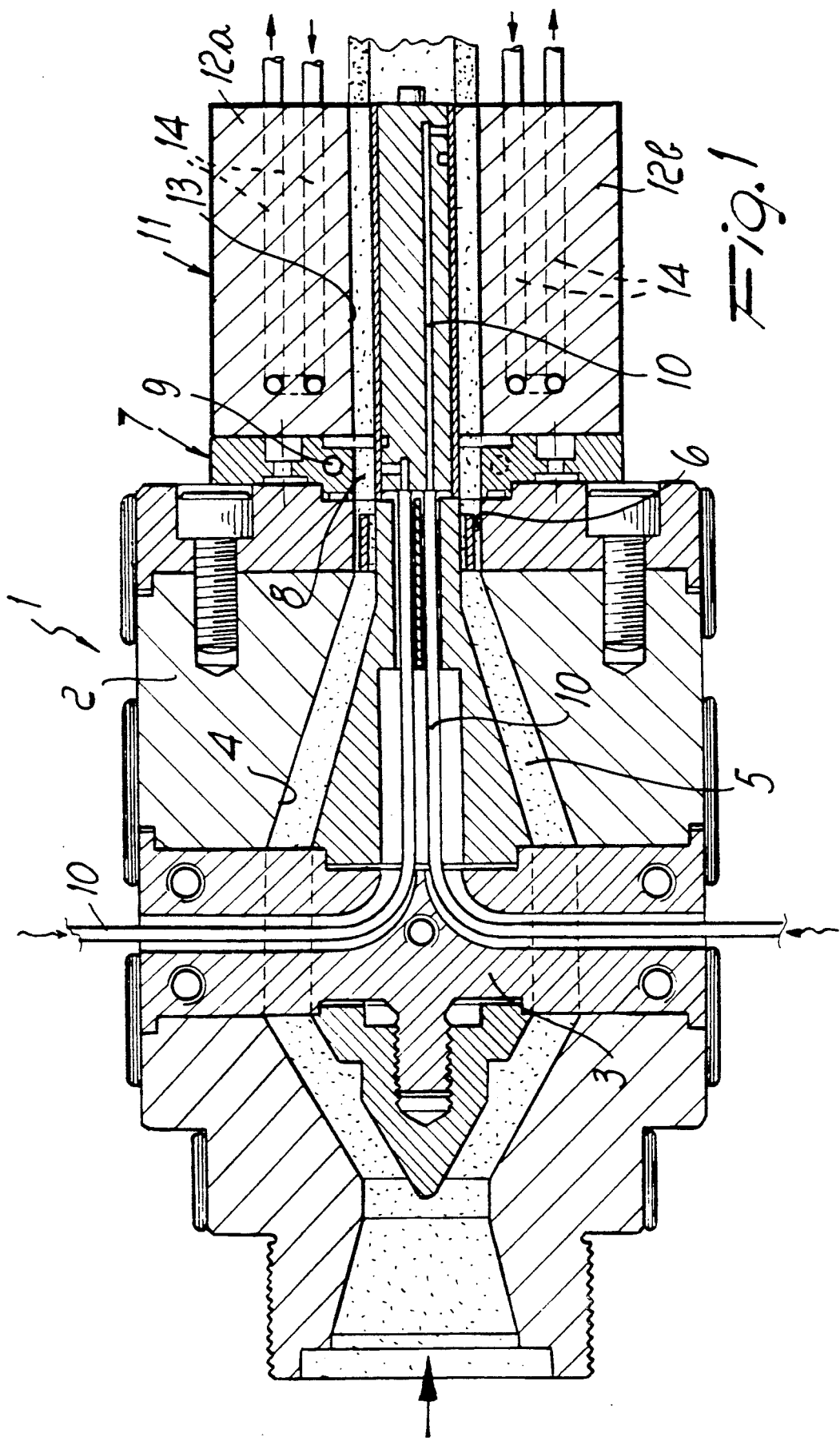
FIG. 1 is a longitudinal sectional a view of the extrusion head according to the invention.

With reference to the above figures, the extrusion head according to the invention, generally indicated by the reference numeral 1, comprises a head body 2 with elongated configuration inside which a cavity is defined; said cavity accommodates, in a known manner, a male element 3. Said male element 3 defines, together with the walls of the cavity in which it is contained, a passage 4 along which the foamed material 5 to be extruded, constituted for example by polyvinylchloride with the addition of substances which cause its foaming, is pushed.

The passage 4 leads outside the head through an extrusion outlet 6 defined proximate to a longitudinal end of the head. Said extrusion outlet 6 has a configuration which can be defined also by the co-operation of the end of the male element 3 which faces said outlet 6 and which corresponds to the configuration of the profile of the extruded element to be obtained.

According to the invention, a cooling element 7 is applied to the extrusion head at the extrusion outlet 6, and a passage hole 8 is defined therein. The element 7 is shaped correspondingly to the profile of the extruded element to be obtained and is arranged in alignment with the extrusion outlet 6.

The cooling element 7 is substantially constituted by a block which is applied to the body 2 of the head at the extrusion outlet 6 and in which channels 9 are defined, for example by boring; a cooling fluid, for example water, is circulated in said channels.

The longitudinal end of the male element 3 which is directed toward the extrusion outlet 6 conveniently extends through the extrusion outlet 6 and through the passage hole 8 of the cooling element 7.

Ducts 10 are furthermore defined inside the male element 3 and preferably also inside its extension, and a cooling or heating fluid is caused to circulate therein according to the requirements, so as to keep the temperature of the male element at the values most suitable for the material or for the kind of extrusion to be performed.

It is also advantageously possible to provide a known gauge 11 to be applied to the cooling element 7 on the opposite side with respect to the extrusion head.

Said gauge 11 can be constituted, in a known manner, by a block constituted by two half-shells 12a and 12b which internally define a through cavity 13 which reproduces the final configuration of the extruded element to be obtained. Cooling channels 14 are provided inside the two half-shells 12a and 12b and a cooling fluid, for example water, is circulated therein.

Though it is preferable to provide the gauge 11 in two half-shells to simplify its maintenance, it may also be provided monolithically, since it is not necessary to open it in order to insert the extruded element therein.

The extrusion head according to the invention can be arranged at the beginning of an extrusion line, schematically illustrated in FIG. 2, in which one or more known gauges 15, in this case of the openable type, and means 16 for entraining the extruded element, such as for example a pair of opposite tracks 17a and 17b, are arranged downstream of the head 1.

For the sake of completeness in description, it should be noted that the extrusion head is conveniently provided with heating means constituted for example by electric resistors applied to its outer surface.

The operation of the head according to the invention is as follows.

The foamed material 5 is pushed, with a preset pressure, along the passage 4 toward the extrusion outlet 6. In passing through the cooling element 7, the material undergoes considerable surface cooling before making contact with the air and the setting of a surface layer of the extruded body 20 is thus caused. This setting prevents the extruded body 20 from subsequently expanding upon contact with the air and from acquiring a porosity which would cause the consequent fragility of the extruded body.

The possible presence of the gauge 11 immediately downstream of the cooling element 7 causes a further cooling of the extruded body 20 before it makes contact with the air.

In the initial step of extrusion, the initial end of the extruded body 20 can be easily handled at the exit of the cooling element 7 or of the gauge 11, if provided, and inserted between the pair of tracks 17a and 17b to start its entrainment, by virtue of the surface setting of the extruded body 20 which increases its mechanical resistance.

If the gauge 11 is not provided, the end of the male element supports the extruded body 20 from the inside, facilitating the manual handling thereof.

Once the initial end of the extruded body 20 has been inserted between the tracks 17a and 17b, the extruded body is placed in the open gauges 15, which are subsequently closed.

It should be noted that the extruded body exiting from the cooling element 7, and even more so if the gauge 11 is provided, has a configuration which is already the final configuration, since the surface setting obtained prevents further significant variations of its profile. Due to this fact it is unnecessary to use gauges with negative pressure inside the cavity crossed by the extruded body. The gauges 15 mostly perform a stabilizing effect on the extruded body, gradually terminating its cooling and thus eliminating any stresses due to cooling.

In practice it has been observed that the extrusion head according to the invention fully achieves the intended aim, since by avoiding causing fragility to the extruded element exiting from the extrusion head, extrusion starting times are reduced and the waste of material, which is unavoidable in this step with conventional extrusion heads, is avoided.

Furthermore, by virtue of the fact that the surface setting of the extruded body is obtained, it is possible to use a reduced number of gauges without negative pressure for its stabilization, with the advantage of reducing the friction resistances which oppose its entrainment and therefore of being able to increase the extrusion speed.

A further advantage is that of obtaining an improved degree of surface finish of the extruded element by virtue of the fact that the formation of porosities or blow-holes on its outer surface is avoided.

Though an extrusion head for extruded elements with a circular profile has been shown in the figures, the extrusion outlet 6, the passage hole 8, and the cavities of the gauges for the passage of the extruded body, may obviously have any configuration according to the profile of the extruded element to be obtained.

The extrusion head thus conceived is susceptible to numerous modifications and variations, all of which are within the scope of the inventive concept; all the details may furthermore be replaced with technically equivalent elements.

In practice, the materials employed, so long as compatible with the specific use, as well as the dimensions, may be any according to the requirements and to the state of the art.

I claim:

1. Extrusion head for material, in particular for polyvinylchloride-based foamed material, comprising a head body and a male element, said head body internally accommodating said male element to thereby define a passage for the material to be extruded, said passage extending around said male element and leading outward through an extrusion outlet of said head, said extrusion outlet having a shape, at least one cooling element being applied at said extrusion outlet for achieving a surface cooling of an extruded element exiting from said extrusion outlet, said cooling element being provided with a passage hole, said passage hole of said cooling element having a configuration substantially equal to said shape of said extrusion outlet at least a portion thereof which is arranged immediately at said extrusion outlet, wherein said male element includes a longitudinal end which extends through said extrusion outlet and through said passage hole of said cooling element, said longitudinal end of said male element being provided with means for cooling thereof.

2. Extrusion head according to claim 1, wherein said cooling element is constituted by a block, said block being provided with channels defined therein for circulation of a cooling fluid.

3. Extrusion head according to claim 1, wherein said longitudinal end of said male element is provided with internal ducts for circulation of a cooling fluid.

4. Extrusion head according to claim 1, wherein a cooled gauge is applied immediately downstream to said cooling element, said cooled gauge having a through cavity which is aligned with said passage hole of said cooling element, said through cavity of said gauge having a configuration equal to a shape of an extruded body to be obtained, said longitudinal end of said male element furthermore extending through said cavity of said gauge.

5. Process of extruding material to obtain a tubular element, in particular for extruding a polyvinylchloride-based foamed material, comprising passing the material through a passage defined between a head body and a male element of an extrusion head through an extrusion outlet, and then passing the material through a passage hole of a cooling element arranged immediately after said extrusion outlet which supports and cools the material and through which a longitudinal end provided with means for cooling thereof of said male element extends.

6. Process according to claim 5, further comprising passing the material through a cavity of a cooled gauge which is applied immediately downstream to said cooling element and through which said longitudinal end of said male element furthermore extends.

* * * * *